United States Patent [19]

Nakashima et al.

[11] Patent Number: 4,811,142
[45] Date of Patent: Mar. 7, 1989

[54] MAGNETIC HEAD FOR VERTICAL MAGNETIC RECORDING AND METHOD OF PRODUCING SAME

[75] Inventors: Keishi Nakashima; Tetsuya Iwata; Yasuo Tanaka; Toshiaki Hashidate, all of Nagaoka, Japan

[73] Assignee: Alps Electric Co., Japan

[21] Appl. No.: 885

[22] Filed: Jan. 6, 1987

[30] Foreign Application Priority Data

Feb. 27, 1986 [JP] Japan .................................. 61-43614

[51] Int. Cl.⁴ .......................... G11B 5/60; G11B 5/187
[52] U.S. Cl. ...................................... 360/103; 360/125; 360/126; 360/119; 360/122
[58] Field of Search ................ 360/103, 125, 102, 126, 360/122, 119, 110

[56] References Cited

U.S. PATENT DOCUMENTS

| | | | |
|---|---|---|---|
| 4,438,471 | 3/1984 | Oshiki et al. | 360/125 |
| 4,555,739 | 11/1985 | Le Van et al. | 360/103 |
| 4,638,391 | 1/1987 | Hatanai et al. | 360/125 |
| 4,695,512 | 9/1987 | Hatanai et al. | 360/119 |
| 4,698,708 | 10/1987 | Lazzari | 360/103 |
| 4,720,757 | 1/1988 | Hatanai et al. | 360/125 |

FOREIGN PATENT DOCUMENTS

| | | | |
|---|---|---|---|
| 56-80814 | 7/1981 | Japan | 360/103 |
| 61-222006 | 10/1986 | Japan | 360/125 |
| 57205811 | 12/1986 | Japan . | |

Primary Examiner—John H. Wolff
Assistant Examiner—Matthew J. Bussan
Attorney, Agent, or Firm—Guy W. Shoup; Paul J. Winters; David W. Heid

[57] ABSTRACT

A main pole exciting type magnetic head for vertical magnetic recording, including a lower slider formed of a magnetic material, a winding core formed of a magnetic material, a substrate formed of a non-magnetic material and disposed so that one end face thereof is positioned on an upper surface of the winding core, a main pole film formed on one end face of the substrate, and an upper slider formed of a magnetic material, the upper slider being opposed to the lower slider through a vertical magnetic recording medium; as well as a method of producing such magnetic head.

9 Claims, 8 Drawing Sheets

MAGNETIC HEAD FOR VERTICAL MAGNETIC RECORDING AND METHOD OF PRODUCING SAME

BACKGROUND OF THE INVENTION

1. Field of the Invention

The present invention relates to a magnetic head for vertical magnetic recording and a method of producing same. Particularly, it is concerned with a main pole exciting type magnetic head for vertical magnetic recording and a method of producing same.

2. Description of the Prior Art

Heretofore, as magnetic heads for vertical magnetic recording of this type, there have been known, for example, those disclosed in Japanese Patent Laid Open Nos. 136004/85 and 58730/82.

In the magnetic head for vertical magnetic recording disclosed in Japanese Patent Laid Open No. 136004/85, a magnetic ferrite substrate having a transversely extending groove formed in one face thereof is bonded to a nonmagnetic ceramic substrate so that the respective faces are put one on the other, and for the adjacent faces of both substrates thus bonded a magnetic recording main pole is formed so that force end and base end portions thereof are positioned on the face on the non-magnetic ceramic substrate side and that on the magnetic ferrite substrate side, respectively; further, the main pole-formed faces of both substrates are cut off until exposure of the groove while leaving the main pole portions and grinding or the like is applied to the surface of the non-magnetic ceramic substrate to use the surface as a float surface for a magnetic recording medium, and a coil is applied to the main pole through the groove of the magnetic ferrite substrate.

In the magnetic head for magnetic recording disclosed in Japanese Patent Publication No. 58730/82, there is provided a head block structure comprising a slider portion substrate, a winding portion substrate, both formed of a magnetic material, and a gap portion substrate formed of a non-magnetic material on the surface sides of both substrates, and a slider portion, a track portion and a gap portion are formed as thin films in predetermined surface positions of the head block structure selectively by vapor deposition or sputtering.

However, the above conventional magnetic heads for vertical magnetic recording are all complicated in structure and hence the manufacturing method is also complicated, making it difficult to ensure the dimensional accuracy. Besides, the difficulty of ensuring the dimensional accuracy makes it impossible to obtain a sufficiently high reproduction output.

SUMMARY OF THE INVENTION

The present invention has been accomplished in view of the above points. It is an object thereof to provide a magnetic head for vertical magnetic recording which is simple in structure and which can ensure the dimensional accuracy easily, thereby making it possible to obtain a high reproduction output.

It is another object of the present invention to provide a method of producing a magnetic head for vertical magnetic recording which is easy to manufacture and ensure the dimensional accuracy.

According to the present invention there is provided a main pole exciting type magnetic head for vertical magnetic recording provided with a lower slider formed of a magnetic material, a winding core formed of a magnetic material, a substrate formed of a non-magnetic material so that one end face thereof is positioned on an upper surface of the winding core, a main pole film formed on the said one end face of the substrate, and a magnetic member opposed to the lower slider through a vertical magnetic recording medium.

According to the present invention there is also provided a method of producing a magnetic head for vertical magnetic recording, which method comprises the steps of forming a film of a non-magnetic material on a substrate to thereby provide an undercoat layer; forming a film of a magnetic material on the undercoat layer to thereby provide a main pole film; processing the main pole film into a stripe-like pattern having a predetermined width; forming a film of a non-magnetic material as a protective film on both the undercoat layer and the main pole film; cutting the substrate into a desired size; bonding both end portions of a winding core to a slider through an adhesive; grinding an upper surface portion of the slider including an upper end portion of the winding core to form a stepped portion; attacking the substrate onto the stepped portion so that the main pole film is positioned on the winding core; grinding the slider to form a pad face and an air groove; and applying winding to the winding core.

In the magnetic head for vertical magnetic recording of the present invention, a magnetic signal picked up by the main pole film causes a reproduction voltage to be developed in a coil through a closed magnetic circuit including the winding core and the slider.

And in the method of producing a magnetic head for vertical magnetic recording of the present invention, the substrate is attached to the slider so that the main pole film is positioned on the winding core.

DESCRIPTION OF PREFERRED EMBODIMENTS

Figure 1:
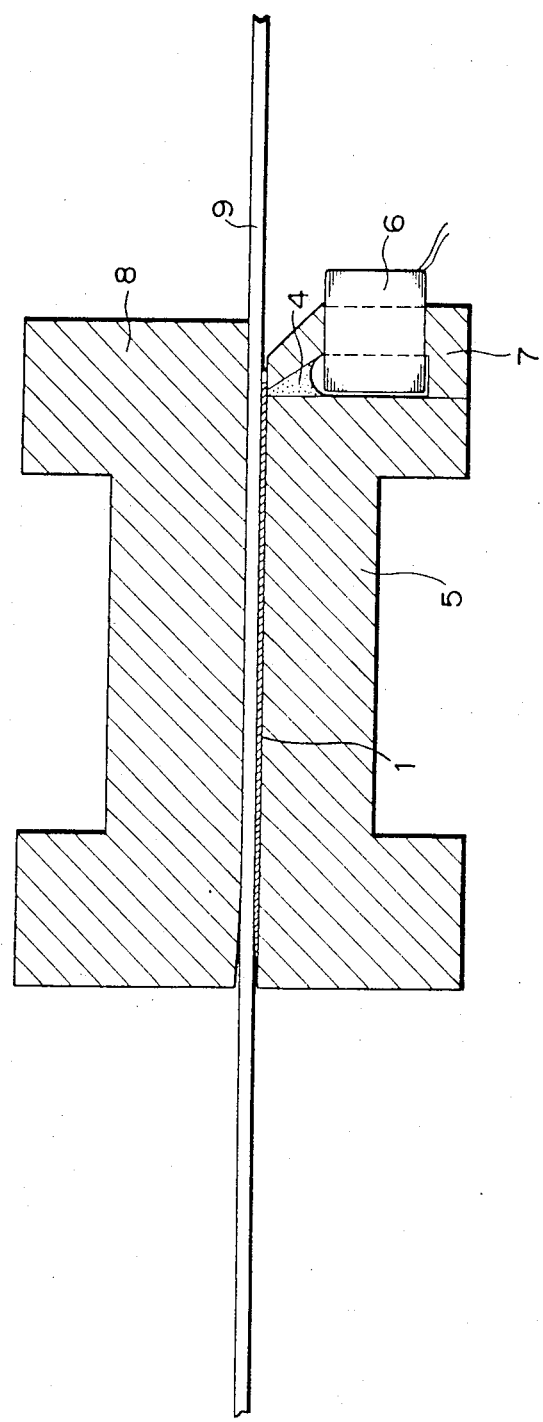
FIG. 1 is a sectional view of a magnetic head for vertical magnetic recording according to an embodiment of the present invention.
Figure 2:
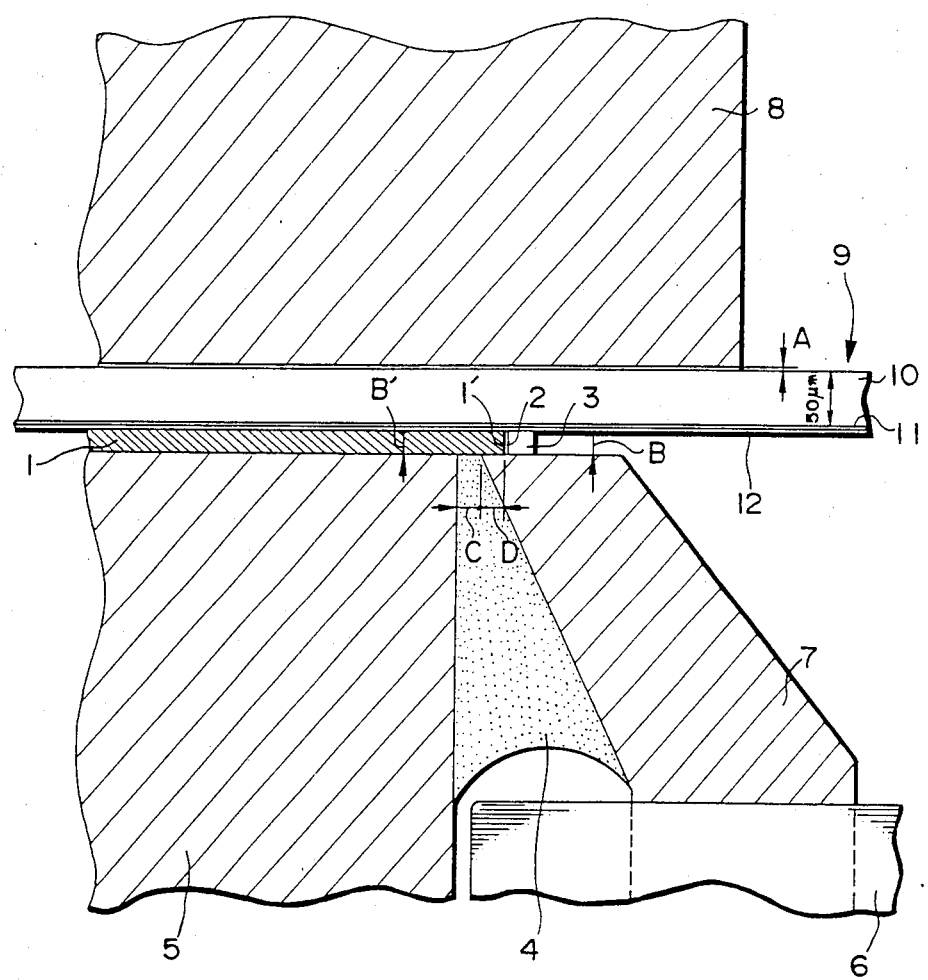
FIG. 2 is an enlarged sectional view of a principal portion thereof.

FIG. 1 is a sectional view showing a magnetic head for vertical magnetic recording according to an embodiment of the present invention and FIG. 2 is an enlarged sectional view of a principal portion thereof. The magnetic head of this embodiment is composed of a substrate 1, an undercoat layer 1' formed on one end face of the substrate 1, a main pole film 2 formed on the undercoat layer 1', a protective film 3 formed over the main pole film 2, an adhesive 4 for fixing a winding core 7 to a lower slider 5, the lower slider 5, a recording/reproducing coil 6, the winding core 7 for winding thereon of the coil 6, and an upper slider 8 disposed above and in opposed relation to the lower slider 5.

A vertical magnetic recording medium 9 is disposed between the substrate 1 attached to lower slider 5 and the upper slider 8. It is composed of a base film 10, a high magnetic permeability layer 11 formed on the base film 10, and a vertical magnetic recording layer 12 laminated onto the high magnetic permeability layer 11. The base film 10 is formed in a thickness of about 50 $\mu$m from a synthetic resin such as polyethylene terephthalate. The high magnetic permeability layer 11 is formed in a thickness of 0.3 to 1.0 $\mu$m by the sputtering of Ni-Fe for example. The vertical magnetic recording layer 12 is formed in a thickness of 0.1 to 0.5 $\mu$m by the sputtering of Co-Cr for example.

The method of producing the magnetic head of this embodiment thus constructed will be explained below.

Figure 3A:
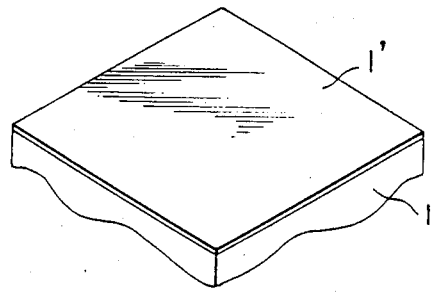
FIGS. 3(a) to 3(e) are perspective views showing successive manufacturing steps for a substrate illustrated in FIG. 1.

First, as shown in FIG. 3(a), on the substrate 1 made of a non-magnetic material such as glass, crystallized glass, ferrite, ceramic, $Al_2O_3$, or $Al_2O_3$-Ti, there is formed the undercoat layer 1' by the sputtering of a non-magnetic material such as $SiO_2$ or $Al_2O_3$.

Figure 3D:
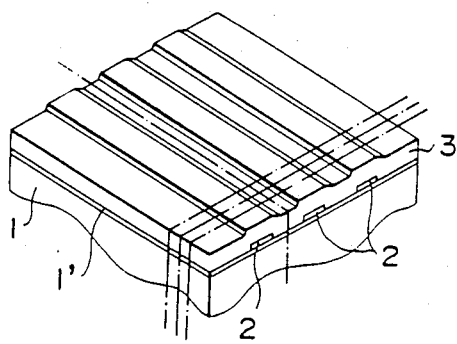
Figure 3B:
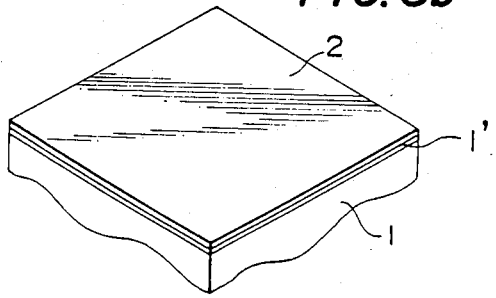

Then, as shown in FIG. 3(b), on the undercoat layer 1' there is formed the main pole film 2 as a thin film by the sputtering of an amorphous metal such as Permalloy, Sendust, Co-Zr-Nb, or Co-Hf-Ta. The recording line density is determined according to the thickness of the main pole film 2 thus formed.

Figure 3E:
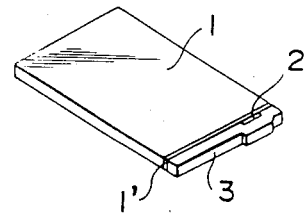
Figure 3C:
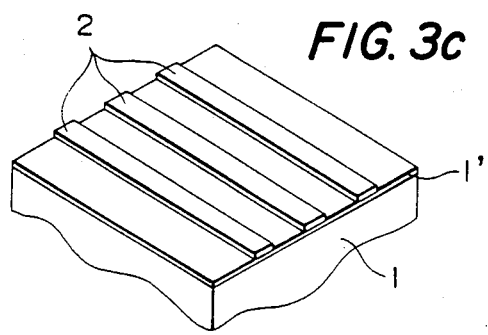

Subsequently, as shown in FIG. 3(c), the main pole film 2 is processed into a stripe-like pattern having a predetermined width by wet or dry etching. The width of the pattern thus formed is a track width which determines a track density.

Then, as shown in FIG. 3(d), the protective film 3 is formed on the undercoat layer 1' and the main pole film 2 by the sputtering of a non-magnetic material such as $SiO_2$ or $Al_2O_3$.

Then, the substrate 1 with the main pole film 2 etc. formed thereon is cut in two directions along dot-dash lines in the figure to give a desired size; as a result, there is obtained such a thin plate-like substrate 1 as shown in FIG. 3(e).

Figure 4A:
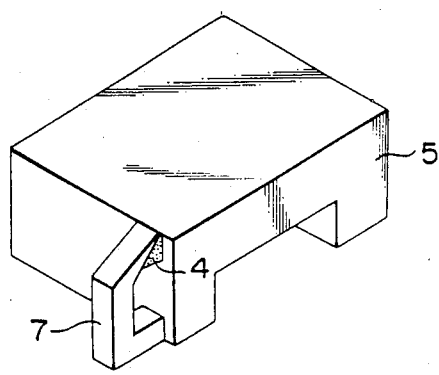
FIGS. 4(a) to 4(d) are perspective views showing successive manufacturing steps for the magnetic head of FIG. 1.

On the other hand, as shown in FIG. 4(a), both end portions of the winding core 7 which is formed in the shape of C by Mn-Zn ferrite, Ni-Zn ferrite, or amorphous metal, are bonded, by the adhesive 4 comprising glass, resin or any other suitable material, to a right-hand side position of a front end face of the lower slider 5 formed of Mn-Zn ferrite, Ni-Zn ferrite, or amorphous metal.

Figure 4C:
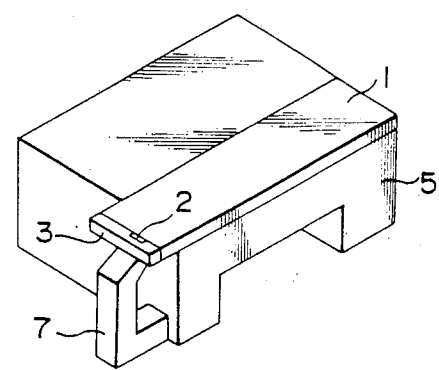
Figure 4B:
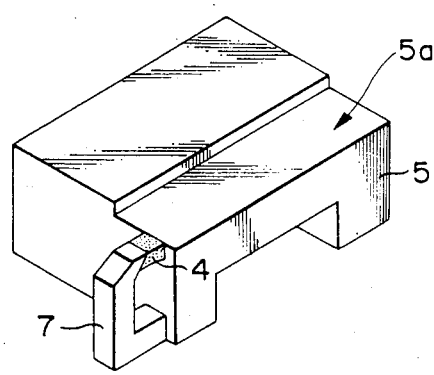

Thereafter, as shown in FIG. 4(b), a right-hand upper surface portion of the lower slider 5, including an upper end portion of the winding core 7, is subjected to grinding to form a stepped portion 5a.

Subsequently, as shown in FIG. 4(c), the substrate 1 obtained in FIG. 3(e) is attached to stepped portion 5a with glass, resin or any other suitable material so that the main pole film 2 is positioned on the winding core 7.

Figure 4D:
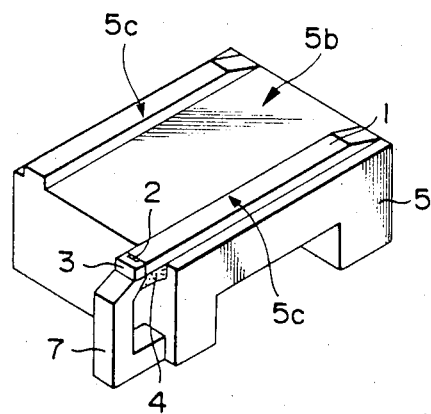

Then, as shown in FIG. 4(d), the upper surface portion of the lower slider 5 is subjected to grinding to form an air groove 5b and pad faces 5c.

Thereafter, the coil 6 is wound round the core 7 and the upper slider 8 formed of the same magnetic material as the lower slider 5 is disposed, whereby there is obtained the magnetic head for vertical magnetic recording of this embodiment shown in FIGS. 1 and 2.

Although in the above magnetic head manufacturing method the undercoat layer 1', main pole film 2 and protective film 3 are formed by sputtering, these may be formed by another method such as vapor deposition, plating, or ion plating.

Using the magnetic head of this embodiment thus produced, there are performed recording and reproduction for the vertical magnetic recording medium 9 in the following manner. The vertical magnetic recording medium 9 is put on the pad faces 5c of the lower slider 5, then the upper slider 8 is disposed on the recording medium 9, and the recording medium 9 is moved while allowing a signal current to flow in the coil 6. As a result, a magnetic flux induced in the coil 6 becomes high in density through the winding core 7 and the main pole film 2 which is extremely thin, and passes through the vertical magnetic recording layer 12 of the vertical magnetic recording medium 9 in the thickness direction, then passes through the high magnetic permeability layer 11 of the vertical magnetic recording medium 9 and returns to the lower slider 5 through again through the vertical magnetic recording layer 12, thereby magnetizing the vertical magnetic recording layer 12 in the thickness direction to effect signal recording.

For reproducing a recorded signal from the vertical magnetic recording medium 9 by using the magnetic head for vertical magnetic recording of this embodiment, a signal which has been recorded in the form of residual magnetism in the vertical magnetic recording layer 12 is picked up by the main pole film 2, whereby a reproduction output is taken out as an induced voltage in the coil 6.

Figure 5:
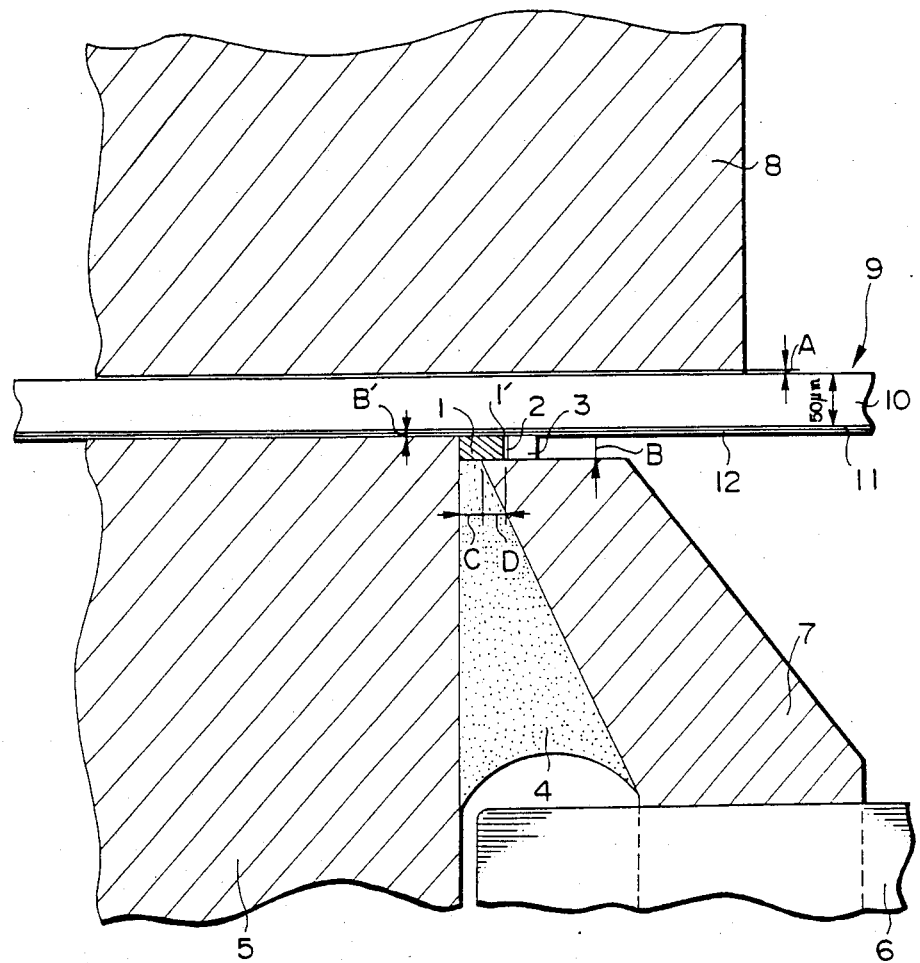
FIG. 5 is a sectional view showing a modification of the magnetic head of FIG. 1.

Although in the magnetic head for vertical magnetic recording of the above embodiment the upper surface of the lower slider 5 and that of the winding core 7 are made flush with each other and the substrate 1 is attached to lower slider 5, the upper surface of the lower slider 5 and that of the winding core 7 may be made different in height and in this case the substrate 1 is made small in size and it is attached to the upper surface of the winding core 5, as shown in FIG. 5.

In order to increase the reproduction voltage by using the magnetic head for vertical magnetic recording of this embodiment, a gap A between the upper slider 8 and the vertical magnetic recording medium 9, a gap B between the vertical magnetic recording medium 9 and the winding core 7, a gap B' between the vertical magnetic recording medium 9 and the lower slider 5, a gap C between the lower slider 5 and an inner end portion of the upper surface of the winding core 7, and a spacing D between the said inner end portion and the main pole film 2, as shown in FIGS. 2 and 5, may be controlled as follows.

Figure 8:
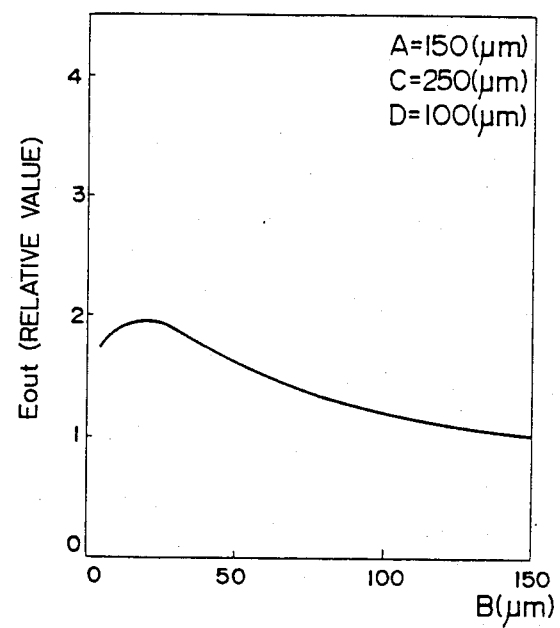
FIG. 8 illustrates characteristics of an output voltage vs. a gap between a winding core and a vertical magnetic recording medium.
Figure 9:
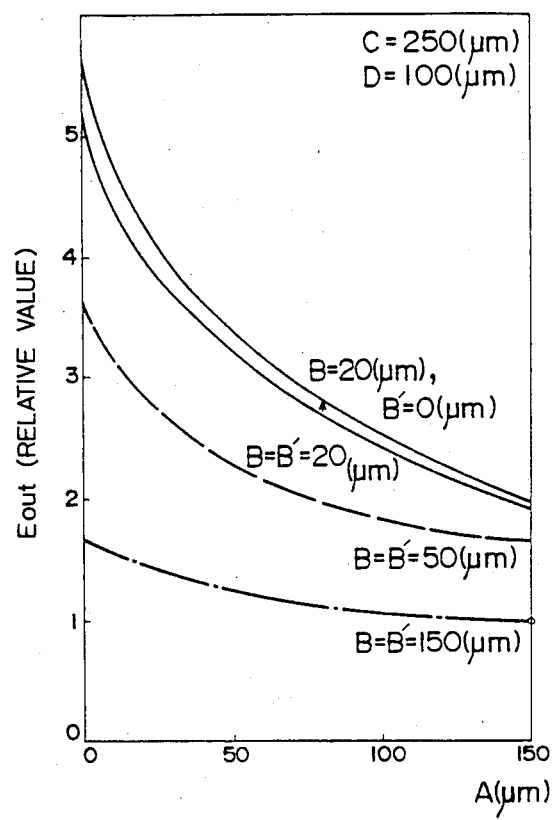
FIG. 9 illustrates characteristics of an output voltage vs. a gap between an upper slider and the vertical magnetic recording medium.

FIG. 9 is a characteristic diagram which shows changes in relative value of the reproduction voltage Eout with changes of A and B, B' and in which C is 250

μm and D is 100 μm. As can be seen from this figure, the reproduction voltage Eout can be increased by making A smaller (preferably 0) and it can also be increased by making B smaller (see FIG. 8). By controlling A and B thereby can be obtained an approximately fivefold reproduction voltage. Further, by making small (preferably 0) only B' of B and B' it is made possible to further increase the reproduction voltage Eout to some extent.

Figure 10:
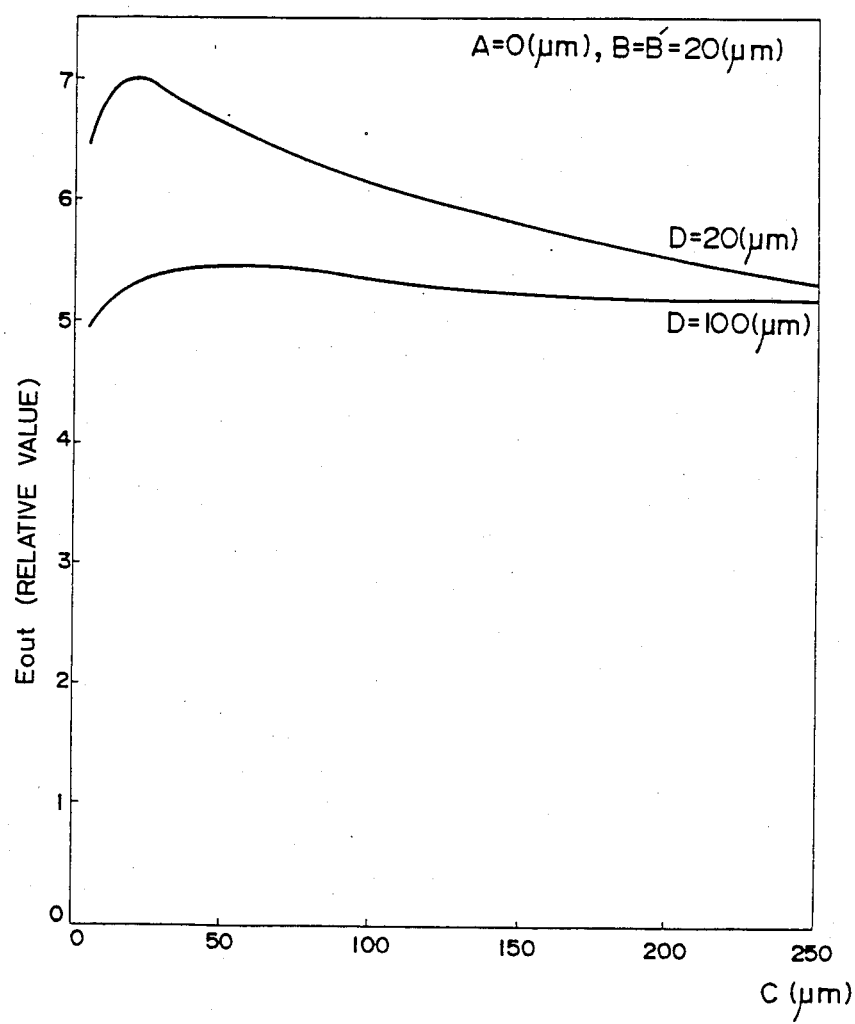
FIG. 10 illustrates characteristics of an output voltage vs. a gap between a lower slider and the winding core.

FIG. 10 is a characteristic diagram which shows changes in relative value of the reproduction voltage Eout with changes of C and D and in which there are set A=0 μm and B=B'=20 μm. As can be seen from this figure, the reproduction voltage Eout is increased by making C and D smaller, but C and D have optimum values. Thus by controlling A, B, B', C and D to optimum values it is made possible to obtain an approximately sevenfold reproduction voltage Eout.

To sum up, a magnetic head for vertical magnetic recording having a high reproduction output is obtained under the following conditions:

A: as close to 0 as possible
B: 1–50 μm (preferably 5–30 μm)
B': as close to 0 as possible
C: 1–50 μm (preferably 5–30 μm)
D: 1–50 μm (preferably 5–30 μm)

Although in the above embodiment there is used the one-side recording vertical magnetic recording medium 9 having the high magnetic permeability layer 11 and the vertical magnetic recording layer 12 which are provided on only one face of the base film 10, it goes without saying that the vertical magnetic recording medium 9 may be a both-side recording medium having the high magnetic permeability layer 11 and the vertical magnetic recording layer 1 which are provided on both faces of the base film 10.

Figure 6:
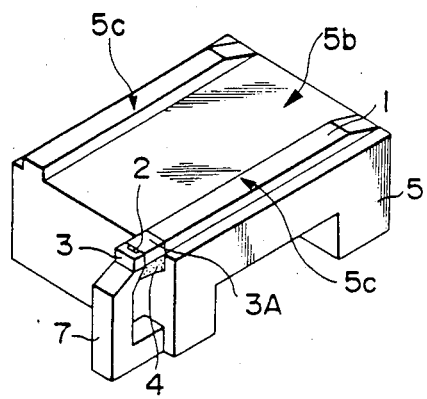
FIG. 6 is a perspective view of a magnetic head for vertical magnetic recording according to another embodiment of the present invention.
Figure 7:
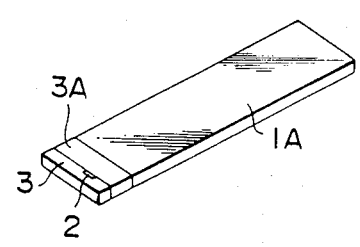
FIG. 7 is a perspective view showing a substrate used in the production of the magnetic head of FIG. 6.

FIG. 6 is a perspective view of a magnetic head for vertical magnetic recording according to another embodiment of the present invention. In this embodiment the magnetic head employs a substrate 1A shown in FIG. 7 in place of the substrate 1 shown in FIG. 3(e). The substrate 1A has a thick protective film 3A in place of the undercoat layer 1'. The protective film 3A can be formed by thickening the undercoat layer 1'. Alternatively, it may be newly provided between the undercoat layer 1' and the main pole 2 as well as the protective film 3.

It goes without saying that also in the magnetic head for vertical magnetic recording of this embodiment there can be obtained the same function and effect as in the embodiments illustrated in FIGS. 1, 2 and FIG. 5.

As set forth hereinabove, according to the magnetic head for vertical magnetic recording of the present invention there are obtained the following effects.

1. A high track density recording can be effected by a high output core structure.
2. Recording having a high reliability of data can be effected because a high output is obtained even at a low speed of the vertical magnetic recording medium.
3. Because of a simple structure there is attained a high mechanical reliability between the vertical magnetic recording medium and the magnetic head for vertical magnetic recording.

Further, according to the method of producing a magnetic head for vertical magnetic recording of the present invention there are obtained the following effects.

1. Mass productivity is high because a large number of main pole films are obtained in a single film forming step.
2. High accuracy is attained because the thickness of the main pole film which determines recording characteristics is determined by the film forming time of a sputtering apparatus.
3. Accuracy and mass productivity are high because the track processing can be done by etching.

What is claimed is:

1. A main pole exciting type magnetic head for vertical magnetic reading on a magnetic recording medium comprising:
   a slider composed of magnetic material, said slider having a first planar surface for placement in substantially parallel relationship to said magnetic recording medium and a second planar surface substantially perpendicular to said first planar surface;
   a winding core composed of magnetic material attached to said second planar surface, said winding core terminating at an upper end disposed adjacent to said first planar surface with the inner edge of said upper end spaced from said second planar surface by a first distance; and
   a substrate of non-magnetic material having a main pole film of magnetic material on one face of said substrate with a protective film covering said main pole film, with said substrate positioned on and attached to the upper end of said winding core such that one end of the main pole film contacts the upper end of said winding core and such that said main pole film is perpendicular to the plane of said first planar surface, with said main pole film spaced from said second planar surface by a second distance, greater than said first distance.

2. A magnetic head according to claim 1, wherein the upper end of said winding core is substantially coplanar with said first planar surface and said substrate extends along said first planar surface forming a rail.

3. A magnetic head according to claim 4, wherein the upper end of said winding core is below the plane of said first planar surface.

4. A magnetic head according to any of claims 1, 2, or 3, wherein when said head is positioned in operative relationship with said magnetic recording medium the distance between the upper end of said winding core and the surface of said magnetic recording medium is in the range of from 1.0 to 50.0 μm.

5. A magnetic head according to claim 4, wherein said first distance and said second distance is in the range from 1.0 to 50.0 μm.

6. A magnetic head according to any of claims 1, 2, or 3, wherein said first distance and said second distance is in the range of from 0.1 to 50.0 μm.

7. A magnetic head according to any of claims 1, 2, 3 or 5, wherein an undercoat layer is interposed between said one face of said substrate and said main pole film.

8. A magnetic head according to claim 4, wherein an undercoat layer is interposed between said one face of said substrate and said main pole film.

9. A magnetic head according to claim 6, wherein an undercoat layer is interposed between said one face of said substrate and said main pole film.

* * * * *